3,317,378
METHOD OF CONTROLLING BLOAT IN RUMINANTS

Walter R. Woods, Lincoln, Nebr., and Keith J. Smith, Ames, Iowa, assignors to Iowa State University Research Foundation, Inc., Ames, Iowa, a corporation of Iowa
No Drawing. Filed June 18, 1962, Ser. No. 202,978
6 Claims. (Cl. 167—53)

This invention relates to a method of controlling bloat in ruminants. In other words, this invention is concerned with the prevention of bloat rather than with its treatment. In another of its phases, this invention is concerned with compositions which can be used for controlling or preventing bloat.

Bloat is an affliction of livestock occurring in many parts of the world. The term usually refers to domestic ruminants, particularly the bovine and ovine species. Ordinarily, bloat is characterized by an accumulation of gas and foam within the rumen, or first compartment of the stomach, in sufficient quantity that the normal pressure within the rumen is exceeded and distention of the rumen results. The distention of the rumen can be observed exteriorly as a swelling of the abdomen, particularly on the left side. The extent of the distention increases with the severity of the condition.

Under normal conditions on the farm, the husbandman cannot afford a constant watch on a herd of grazing animals, particularly since bloat is often sporadic in nature, not occurring for a considerable time and then striking with no warning. Even when the herd is under constant surveillance, it may be difficult to drive animals that are bloated to a place where they can be restrained and treated in time. Damage resulting from bloat is not confined to death losses (although these are the usual data reported in statistical studies on the subject). Uncertainties involved often cause much inconvenience and concern to the farmer. Furthermore, there are additional losses due to impaired production of meat and milk in animals afflicted with bloat. Another substantial loss occurs indirectly, since farmers often refrain from the use of legumes (which are high yielding and nutritious) because of the risk of bloat.

Bloat as it occurs during the consumption of fresh legumes or the feeding of finely-ground grains is characterized by the development of a stable foam within the rumen which, if unrelieved, can result in the serious complications mentioned above. In large part, the increase in bloat in recent years has probably been due to changes in management and feeding practices and a great increase in the acreage of legumes, alfalfa and ladino clover in particular.

In the past, attempts have been made to prevent or control bloat through pasture management, grazing control, feeding of dry roughage and the administration of anti-foaming agents or antibiotics. None of these expedients has proven practical. One reason why prevention and control measures have not been effective is that there is as yet no adequate theoretical understanding of the cause or causes of bloat.

It is therefore a general object of this invention to provide a novel method for controlling or preventing bloat, the method being particularly applicable to cattle and sheep. A more specific object is to develop a preparation which can be orally administered to ruminants for the purpose of reducing the incidence and severity of bloat. Further objects and advantages will be indicated in the following detailed specification.

This invention is based in part on the discovery that there appears to be a relationship between the concentration of free magnesium and calcium ions in the rumen or stomachs of the animals and the development of bloat. The experimental work leading to the present invention has demonstrated that the oral administration of a calcium or magnesium chelating agent will reduce the extent and severity of bloat in ruminants. It is possible, of course, that the chelating agent may have some other action in addition to its function of sequestering magnesium and calcium ions, but this appears to be the primary action involved.

On the basis of available information, it is believed that any chelating agent capable of sequestering calcium and magnesium can be used in practicing the present invention, providing the chelating agent is not unduly toxic to cattle and sheep. The ethylene polyamine chelates have been found to be particularly suitable. One preferred class is those which are formed from ethylene diamine or ethylene triamine and acetic acid. For example, diethylene triamine pentaacetic acid, ethylene diamine tetraacetic acid, or an ethylenediamine dihydroxy acetic acid, can be used. In these compounds, the acetic acid moiety is attached to a nitrogen. These compounds can be used either in their acid form or in the form of sodium or potassium salts, such as the mono- or disodium salts. One specific compound which is suitable for practicing the present invention is disodium ethylenediamine di-(o-hydroxyphenylacetate). Good results have been obtained with the disodium salt of diethylene triamine pentaacetic acid. It will be understood that the chelating agent as administered should preferably be entirely free of chelated magnesium or calcium. While other divalent metal ions can be present in the chelating agent, providing they exchange with calcium and magnesium, it is preferred to have the chelating agent free of metal ions except for monovalent metal ions like potassium and sodium. This leads to maximum effectiveness of the chelating agent in a minimum sized dose.

The optimum dose will vary with the species and age of the ruminants. In general, sheep will require smaller dosages than cattle, and older, heavier animals will require larger doses than the younger animals. On the basis of available evidence, it is believed that the useful dosage for sheep will not be less than .25 gram (gm.) per twenty-four hours, and for cattle not less than 1 gm. per 24 hours. With sheep, it will usually not be necessary or desirable to administer more than 15 gms., and for cattle not more than 60 gms., per 24 hours. With ethylene polyamine chelates, the preferred range for sheep appears to be from about .5 to 5 gms. per 24 hours. Correspondingly, the preferred range for cattle with these chelates would be from 2 to 25 gms. per 24 hours. If the diet of the animals is unsually high in calcium and/or magnesium compounds, it will usually be desirable to employ somewhat more of the chelating agent than would otherwise be required.

The chelating agents described above should be administered to the ruminants periodically during the time in which the ruminants are particularly susceptible to bloating. It is believed that best results can be obtained by administering the chelating agent at least once during each 24 hours. The chelating agent can be orally administered in various ways. For example, the chelating agent can be given in the form of an aqueous solution, viz., as a drench. It can also be given in the form of a capsule or bolus. One convenient procedure is to mix the chelating agent, either as a dry powder or as an aqueous solution, with the feed material for the animals. Where the ruminants are receiving a prepared feed material, such as a protein supplement, the chelating agent can be conveniently combined with the supplement. Since protein supplements are widely used and are fed in specified amounts, such as .2 to .25 pound per day to sheep, or one to two pounds per day to cattle, the desired dose or level of the chelating agent can be readily achieved.

This invention is further illustrated by the following specific examples:

Example I

A series of trials was conducted in which 48 wether lambs were grazed on plots of alfalfa. The lambs were grazed twice daily for approximately 1 to 1½ hours, depending on the severity of bloat occurring. The remainder of the time they were kept in dry lot with free access to water and salt. The lambs were evaluated subjectively for degree of bloat on a scale from 0 to 5 as described by Johnson et al., J. Animal Sci., 17:893 (1958).

A new seeding of alfalfa had been established and divided into 10 (50 x 200 foot) experimental grazing plots. The lambs were classified as to their bloating pattern in a 7-day period at the start of each grazing season. They were allotted on the basis of their bloating potential into four groups. Treatments were then randomly assigned to the groups.

The test materials were administered directly to the lambs by dissolving them in about 4 oz. of water, which was given as a drench with the aid of a dosing syringe. The drenches were given just prior to turning the lambs out for the morning grazing period.

The compounds and the amounts applied as a drench are given in Table 1. The chelates used were the disodium salt of ethylene diamine tetraacetic acid (EDTA) and the disodium salt of diethylene triamine pentaacetic acid (DTPA). Magnesium carbonate was also administered alone, and in combination with DTPA.

TABLE 1

| | Comparison | Rate/lamb/day | Lamb obs. | Bloat index [1] |
|---|---|---|---|---|
| (1) | Control | | 198 | 1.27 |
| | MgCO$_3$ | 5 gm | 208 | 1.45 |
| | DTPA [2] | 5 gm | 192 | 1.11 |
| | MgCO$_3$+DTPA | 5 gm. each | 198 | 1.16 |
| (2) | Control | | 176 | 1.72 |
| | EDTA [3] | 5 gm | 176 | 1.51 |
| | EDTA | 10 gm | 176 | 1.42 |
| | DTPA | 2½ gm | 176 | 1.19 |
| (3) | Control | | 251 | 1.02 |
| | DTPA | 1¼ gm | 244 | 0.80 |
| | DTPA | 2½ gm | 251 | 0.76 |
| | DTPA | 5 gm | 253 | 0.74 |
| (4) | Control | | 256 | 1.46 |
| | EDTA | 10 gm | 264 | 1.23 |

[1] Sum of maximum bloat scores divided by the number of lamb observations per treatment.
[2] Diethylene triamine pentaacetic acid-disodium salt.
[3] Ethylene diamine tetraacetic acid-disodium salt.

As indicated by Table 2, below, statistical analysis confirmed that DTPA and EDTA significantly reduced the severity of bloat. The data were pooled within each treatment and control. The frequency distribution of the bloat scores for the control lambs was considered to be the normal pattern. The lambs scoring 4 and 5 were considered as one score for analyses, since this was considered to be serious bloat. The Chi Square procedure was used to test the deviations of the frequency distribution of the treated lambs as compared to the control lambs.

Example II

A composition for controlling bloat in sheep is prepared by mixing 20 kg. of disodium ethylenediamine di-(o-hydroxy phenylacetate) with one ton of a protein feed supplement. This compound, known commercially as EDDHA, is very active in chelating magnesium and calcium, and is therefore particularly suitable for practicing the present invention. The composition of the protein feed supplement is not critical. It will usually be composed principally of a vegetable meal such as soybean meal, cottonseed meal, etc. To assure uniform mixing, the chelating agent in the form of a dry powder can be mixed and blended with a small portion of the protein supplement to form a pre-mix, and then the pre-mix can be thoroughly blended with the complete body of the supplement. The supplement prepared as described is to be fed to sheep at the rate of .2 lb. per day, thereby giving the sheep 2 gms. of the chelating agent during each 24 hours.

A bloat control composition for cattle can be prepared in the manner described above, except that 15 kg. of the chelating agent is mixed with each ton of supplement. The resulting composition is to be fed to cattle at the rate of 2 lbs. per day, so that the cattle receive 15 gms. of the chelating agent in each 24 hours.

While in the foregoing specification this invention has been described in relation to specific embodiments thereof, and many details have been set forth for purpose of illustration, it will be apparent to those skilled in the art that the invention is susceptible to other embodiments and that certain of the details set forth herein can be varied considerably without departing from the basic principles of the invention.

We claim:

1. The method of controlling bloat in ruminants, characterized by orally administering to said ruminants an ethylene polyamine chelating agent capable of chelating calcium and magnesium, said chelating agent being formed from acetic acid and an amine selected from the group consisting of ethylene diamine and ethylene triamine, the acetic acid moiety of said chelating agent being attached to a nitrogen.

2. The method of claim 1 in which said chelating agent is a sodium salt of a chelating agent selected from the group consisting of diethylene triaminepentaacetic acid, ethylene diamine tetraacetic acid, and ethylenediamene di-(o-hydroxyphenylacetate).

3. The method of controlling bloat in cattle comprising orally administering to said cattle a sodium salt of an ethylene polyamine acetic acid chelate, said chelate being formed from acetic acid and an amine selected from the class consisting of ethylene diamine and ethylene triamine, the acetic acid moiety of said chelating agent being attached to a nitrogen, said chelate being administered at the rate of from 2 to 25 gms. per 24 hours.

4. The method of claim 3 in which said chelate is selected from the group consisting of the sodium salt of diethylene triamine pentaacetic acid, ethylene diamine tetraacetic acid, and ethylenediamine di-(o-hydroxyphenylacetate).

5. The method of controlling bloat in sheep, com-

TABLE 2.—BLOAT INDEX

| Treatment | Amount | n [1] | Control | Treated | Percent change [2] | Significance [3] |
|---|---|---|---|---|---|---|
| DTPA | 1¼ gm./L | 244 | 1.02 | 0.80 | −21.6 | .005 |
| ETDA | 5 gm./L | 176 | 1.72 | 1.51 | [4] −12.2 | .005 |
| EDTA | 10 gm./L | 264 | 1.46 | 1.23 | −15.8 | .005 |

[1] Number of lamb observations per treatment.
[2] The percent change from the controls.
[3] Chi Square used to test for significance.
[4] The treatments are compared to their respective controls and comparison should not be made between treatments.

prising orally administering to said sheep a sodium salt of an ethylene polyamine acetic acid chelate, said chelate being formed from acetic acid and an amine selected from the group consisting of ethylene diamine and ethylene triamine, the acetic acid moiety of said chelating agent being attached to a nitrogen, said chelate being administered at the rate of from .25 to 15 gms. per 24 hours.

6. The method of claim 5 in which said chelate is selected from the group consisting of the sodium salt of diethylene triamine pentaacetic acid, ethylene diamine tetraacetic acid, and ethylenediamine di-(o-hydroxyphenylacetate).

References Cited by the Examiner

UNITED STATES PATENTS 2,604,401  7/1952  Ely _____ 99—4

FOREIGN PATENTS 574,355  4/1959  Canada.
715,848  9/1954  Great Britain.

OTHER REFERENCES

U.S. Dispensatory, 25th Edition, 1955, Lippincott Co., Philadelphia, Pa., page 1685.

SAM ROSEN, *Primary Examiner.*

M. O. WOLK, JULIAN S. LEVITT, *Examiners.*